United States Patent
Haga

(10) Patent No.: US 7,203,140 B2
(45) Date of Patent: Apr. 10, 2007

(54) STORAGE APPARATUS, RECORDING MEDIUM RECORDING A STORAGE MEDIUM DESTRUCTION PROGRAM, AND STORAGE MEDIUM DESTRUCTION METHOD

(75) Inventor: Keiko Haga, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 21 days.

(21) Appl. No.: 11/091,144

(22) Filed: Mar. 28, 2005

(65) Prior Publication Data

US 2005/0169122 A1   Aug. 4, 2005

Related U.S. Application Data

(63) Continuation of application No. PCT/JP2003/003523, filed on Mar. 24, 2003.

(51) Int. Cl.
*G11B 5/09* (2006.01)

(52) U.S. Cl. .............................. 369/47.14; 369/53.15; 369/53.21

(58) Field of Classification Search .................... None
See application file for complete search history.

(56) References Cited

FOREIGN PATENT DOCUMENTS

| JP | 62-175932 | 8/1987 |
|----|-----------|--------|
| JP | 64-030024 | 1/1989 |
| JP | 04-221403 | 8/1992 |
| JP | 5-90612   | 12/1993 |
| JP | 09-097432 | 4/1997 |
| JP | 3049923   | 6/1998 |
| JP | 2002-163801 | 7/2002 |

*Primary Examiner*—Muhammad Edun
(74) *Attorney, Agent, or Firm*—Greer, Burns & Crain, Ltd.

(57) ABSTRACT

A head mounted on various kinds of storage mediums such as a hard disc drive is moved along a storage face to destruct data on the storage medium. Therefore, the data on a storage medium is destructed without disassembling a hard disk drive or the like.

19 Claims, 9 Drawing Sheets

ROTATING DIRECTION

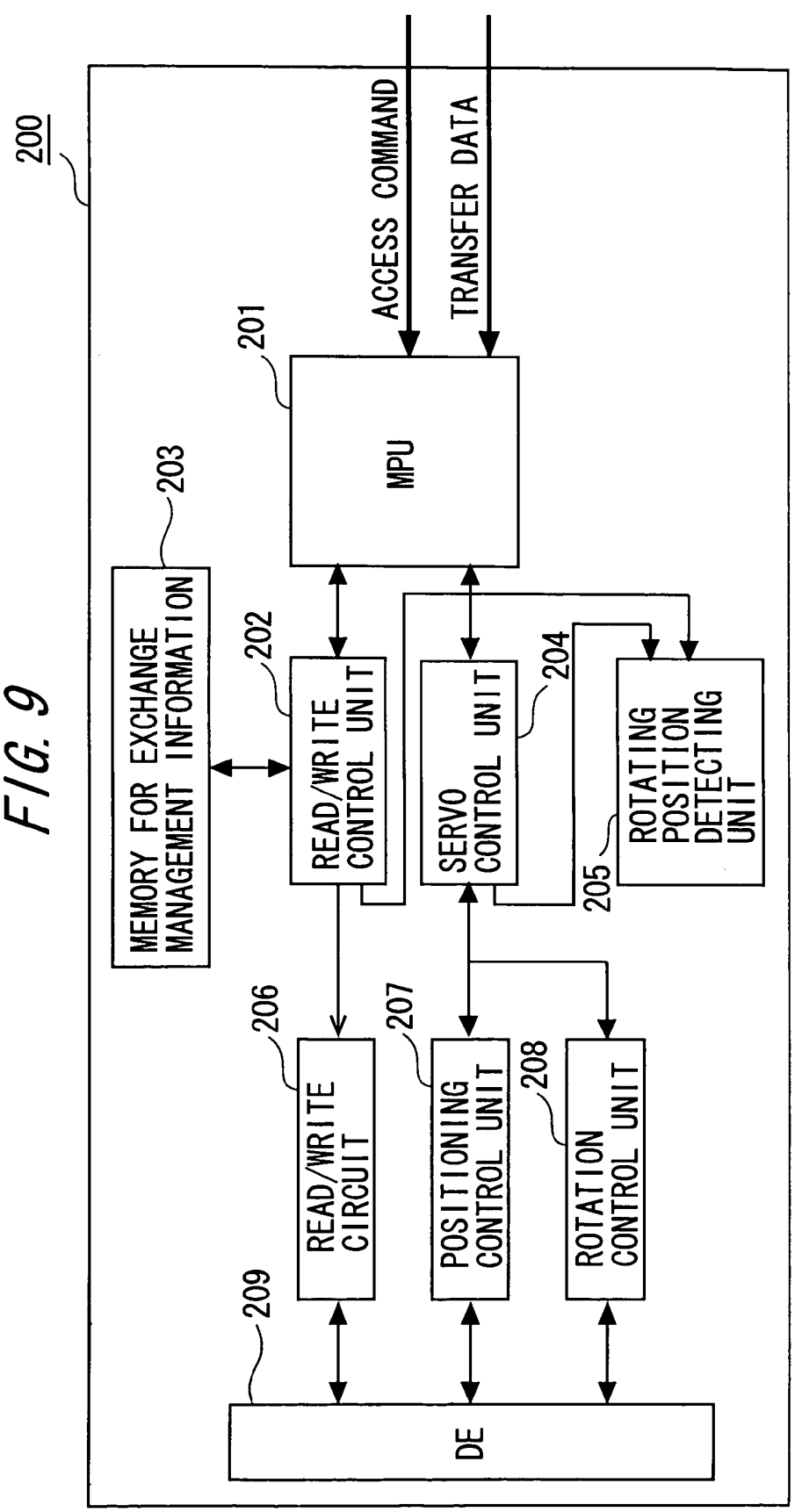

STORAGE APPARATUS, RECORDING MEDIUM RECORDING A STORAGE MEDIUM DESTRUCTION PROGRAM, AND STORAGE MEDIUM DESTRUCTION METHOD

This is a continuation of Application PCT/JP2003/003523, filed on Mar. 24, 2003.

TECHNICAL FIELD

The present invention relates to a destruction technology for destroying a storage medium.

BACKGROUND ARTS

Generally, an information processing apparatus including an existing computer involves employing a hard disc device as an information storage medium.

The hard disc device is the most standard type of data storage device in a computer system. The hard disc device is stored with operating system (OS) and application programs. Further, the hard disc device is stored with user data and operation data. A 3.5-in. type hard disc device, which is a mainstream type of device at the present, has a storage capacity that is equal to or larger than 100 gigabytes per device.

The hard disc device magnetically records the data by rotating at a high speed a disc (also called a [platter]) constructed of a glass or aluminum circular plate coated or vapor-deposited with a magnetic substance. A multiplicity of tracks are disposed concentrically on this platter. Further, sectors (a sector is a unit for reading and writing the data, and one sector normally consists of 512 bytes through several kilobytes) are regularly arranged within the track.

In the hard disc device, when reading and writing the data, at first, a head slider (which will hereinafter be referred to as a head portion) including a read/write head is moved onto a target track. Note that the movement of this head portion is called a 'seek'. After the seek, the hard disc device, when the head is moved to a position just under the target sector, starts reading and writing the data. Total time of a period of seek waiting time and a period of rotation waiting time becomes a period of access time (a period of time till a data transfer is started) to the hard disc. This access time to the hard disc device generally requires several milliseconds. Then, once the data transfer is started, a data transfer speed of the hard disc device is determined corresponding to a rotating speed and a record density of the platter.

Note that in the hard disc device, the head can access a plurality of tracks existing in the same position through one seek by using double sides of the single platter or by simultaneously employing a plurality of platters. Accordingly, performance of the hard disc device is improved by such methods. By the way, in the hard disc device, according to the methods such as erasing the data or formatting (initializing) the disc, etc., the stored data simply look disappeared from the computer.

Namely, the data erasing method given above is a method of deleting, e.g., connection information (initial entry) among blocks configuring a file. In this method, though the connection information among the blocks is deleted, the blocks for storing the data still remain undeleted. Further, the data erasing method described above, for instance, intends to make the data unable to be read by writing the same information (Ex.: 0) to all the files. This method has a possibility that the original data might be decoded by a difference from the same written information.

The hard disc device with the data appearing as if erased can be read if using a special piece of software. Hence, unless a proper measure is taken for the data in the hard disc device in case of disposal or a transfer of a personal computer, a malicious third party might reuse the data of the previous user.

Therefore, when discarding the hard disc device described above, the data can not be completely erased unless the disc medium (storage medium) is destroyed by deassembling the hard disc device.

Accordingly, the general user, inconveniently enough, must destroy the hard disc device by deassembling the computer when discarding the computer. Moreover, even when a waste disposal company conducts a discarding treatment of the computer, this treatment involves a manual work, and consequently it is not so easy to discard a tremendous quantity of hard disc devices. A problem arising when discarding the storage medium is the same with other types of storage mediums such as a CD (Compact Disc), a (DVD (Digital Video or Digital Versatile Disc), an MD (Mini Disc), an FD (Flexible Disk) and so on.

By the way, a technology (refer to, e.g., Patent document 1) for destroying, e.g., an optical disc is disclosed as a technology for destroying the storage medium.

Patent Document 1

Japanese Patent Application Laid-Open Publication No. 64-30024

SUMMARY OF THE INVENTION

Even by the technology in Patent document 1, however, the destruction of the storage medium must involve removing the storage medium from the hard disc device by deassembling a computer.

It is an object of the present invention, which was devised in view of the items described above, to provide a technology for completely destroying the storage surface when discarded without deassembling the hard disc device.

The present invention adopts the following means in order to solve the aforementioned problems.

Namely, the present invention has a contrivance that a head portion including a head for reading or writing information from or to a storage medium is moved along a storage surface of a storage medium, thereby destroying the storage medium.

In the present invention, the head provided in each of a variety of storage mediums of hard disc devices, etc. is moved along the storage surface, thereby destroying the storage medium.

Therefore, according to the present invention, the storage medium can be destroyed without deassembling the hard disc device, etc.

Further, in the present invention, when the head portion moves above the storage surface, a perpendicular position of the head portion with respect to the storage surface may be controlled.

Hence, according to the present invention, the perpendicular position of the head portion when destroying the storage medium can be changed in relation to the perpendicular position at the normal reading/writing time by controlling the perpendicular position of the head portion.

Then, in the present invention, when the head portion moves above the storage surface, the head portion is pressed against the storage surface.

Hence, according to the present invention, the storage surface is destroyed by pressing the head portion against the storage surface, whereby the data can be neither read from nor written to the storage medium any more.

Further, in the present invention, the storage medium is a circular storage medium, and the number of revolutions of the storage medium may be reduced.

The head portion of the storage device gets afloat by a pressure difference of the air between the storage medium and the head portion, which is caused by rotating the storage medium. Then, the perpendicular position of the head portion is lowered by decreasing the number of revolutions of the storage medium, thus pressing the head portion against the storage surface.

Hence, according to the present invention, the storage surface is destroyed by pressing the head portion against the storage surface, whereby the data can be neither read from nor written to the storage medium any more.

Then, in the present invention, storage medium is a circular storage medium, and a rotating direction of the storage medium may be changed.

A force for floating the head portion is generated depending on a shape of the head portion. Then, in the present invention, the force for floating the head portion is prevented from being generated in a way that changes the rotating direction of the storage medium.

Hence, according to the present invention, the storage surface is destroyed by pressing the head portion against the storage surface, whereby the data can be neither read from nor written to the storage medium any more.

Moreover, in the present invention, the head may be supplied with an electric current equal to or larger than an allowable value of an electric current when written to the storage medium.

According to the present invention, the storage surface of the storage medium is destroyed by supplying the head with the electric current equal to or larger than the allowable value of the electric current when written to the storage medium.

Therefore, according to the present invention, the storage surface of the storage medium is destroyed by supplying the head with the electric current, whereby the data can be neither read from nor written to the storage medium any more.

Additionally, in the present invention, a magnetic field equal to or larger than an allowable value of a magnetic field when written to the storage medium may be generated from the head.

In the present invention, the storage surface of the storage medium is destroyed by generating from the head the magnetic field equal to or larger than the allowable value of the magnetic field when written to the storage medium.

Therefore, according to the present invention, the storage surface of the storage medium is destroyed by generating the magnetic field from the head, whereby the data can be neither read from nor written to the storage medium any more.

Moreover, the present invention may also be a program for actualizing any one of the functions given above. Further, in the present invention, a storage medium readable by a computer may be stored with such a program.

Still further, the present invention may also be an apparatus that actualizes any one of the functions described above.

BRIEF DESCRIPTION OF THE DRAWINGS

FIG. 9 is a block diagram showing a normal type of hard disc device.

DETAILED DESCRIPTION OF THE INVENTION

Preferred embodiments of the present invention will hereinafter be described with reference to the drawings in FIGS. 1 through 9.

<First Embodiment>

A first embodiment will be explained with reference to FIGS. 1 through 5. In the first embodiment, the present invention is applied to an information processing device such as a computer, etc. Further, the first embodiment will give one example of a hard disc device as a storage device including a storage medium from and to which the information is read and written in the information processing device. Then, a storage device, a storage medium destruction program and a storage medium destruction method of the present invention are applied to a storage medium discarding process of the hard disc device.

In the first embodiment, the hard disc device given by way of one example of the storage device is preinstalled with a function of executing the storage medium destruction method of the present invention. Then, the hard disc device may be built in the information processing apparatus. Moreover, the hard disc device may also be connected from outside to the information processing device.

The hard disc device is connected to the information processing apparatus and is thereby stored with operating system (OS) and an application program, wherein pieces of information thereof are read and written. Further, the hard disc device is connected to the information processing device and is thereby stored with user data and operation data, wherein pieces of information thereof are read and written.

<Configuration of Device>

Next, the hard disc device including the function of destroying the storage medium according to the first embodiment, will be described.

Figure 1:
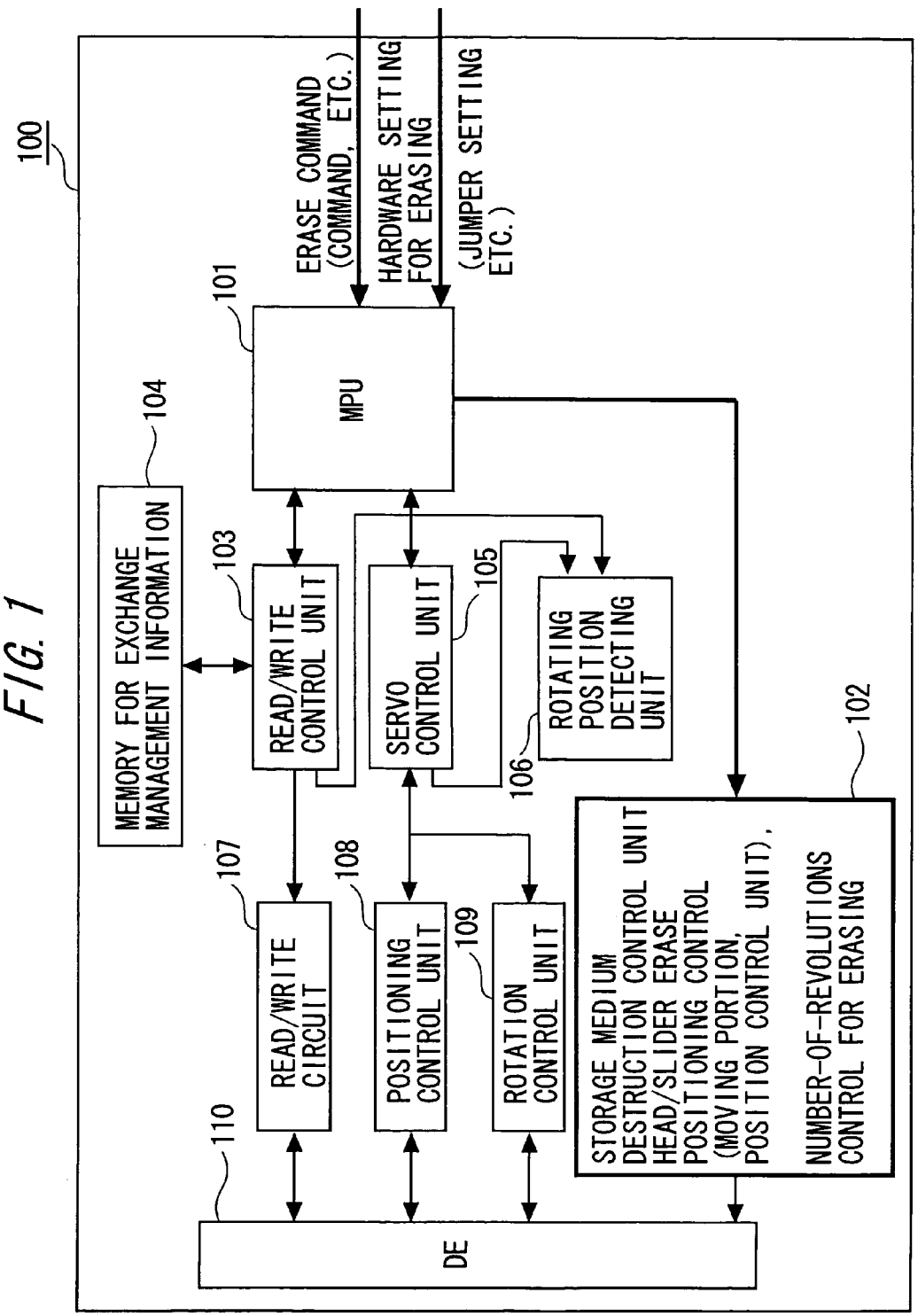
FIG. 1 is a block diagram showing a hard disc device according to an embodiment of the present invention.

FIG. 1 is a block diagram showing one example of a hard disc device 100 according to the first embodiment. The hard disc device 100 according to the first embodiment is constructed of the following components. The hard disc device 100 includes an MPU (Micro Processing Unit) 101, a storage medium destruction control unit 102, a read/write control unit 103, an exchange management information memory 104, a servo control unit 105, a rotating position detecting unit 106, a read/write circuit 107, a positioning control unit 108, a rotation control unit 109 and a DE (Disc Enclosure) 110.

Next, the components will be explained. The MPU 101 accepts an access command to the data to be stored, which is given from a computer (unillustrated). Moreover, the MPU 101, when storing the data, accepts a storage command from the computer. Then, in response to the access command and the storage command, the MPU 101 instructs the respective components to execute processes for carrying out these commands.

The storage medium destruction control unit 102 gives instructions, as exemplified below, to respective elements of the DE 110 in order to execute a storage surface destruction process of the storage medium destruction method according to the first embodiment. To be specific, the storage medium destruction control unit 102 presses a head portion against a storage surface to execute the storage medium destruction method according to the first embodiment. Further, the storage medium destruction control unit 102 generates, from the head, a magnetic field equal to or higher than an allowable value of the magnetic field caused by an electric current for reading and writing in order to execute the storage medium destruction method according to the first embodiment.

Note that the storage medium destruction control unit 102 may also give the instructions to the respective elements of the DE 110 for performing the storage surface destruction process through the read/write control unit 103, the read/write circuit 107, the servo control unit 105, the positioning control unit 108, the rotation control unit 109 and the rotating position detecting unit 106.

For reading and writing the data, the read/write control unit 103 and the read/write circuit 107 (current control means) control the current for generating the magnetic field from the head existing at the DE 110 for reading and writing the data to and from the disc in accordance with a command from the MPU 101 and with rotating position information that will be mentioned later on.

The servo control unit 105 connects to the positioning control unit 108, the rotation control unit 109 and the rotating position detecting unit 106. The servo control unit 105 instructs, through the positioning control unit 108, a moving portion to move a position, above the storage surface of the disc, of the head portion to a predetermined read/write position. Further, the servo control unit 105 controls, through the rotation control unit 109, the number of revolutions of a spindle motor so that the disc reaches the number of revolutions necessary for reading and writing.

The rotating position detecting unit 106 transmits, to the read/write control unit 103, the rotating position information of the disc that is acquired from the rotation control unit 109 via the servo control unit 105. The DE 110 is a generic name of the mechanical components in the hard disc device 100, such as the head portion including the head and a head/slider that serve to effect the read/write, the disc (a platter) defined as the storage medium, the spindle motor (a rotating portion) for rotating the disc, the moving portion for moving the head portion to a sector on the disc, and a perpendicular position moving portion (a pressing portion) for determining a perpendicular position of the head portion with respect to the storage surface of the disc.

<Example of Storage Surface Destruction Process>

Next, one example of the disc storage surface destruction process in the hard disc device 100 according to the first embodiment, will be described.

Figure 2:
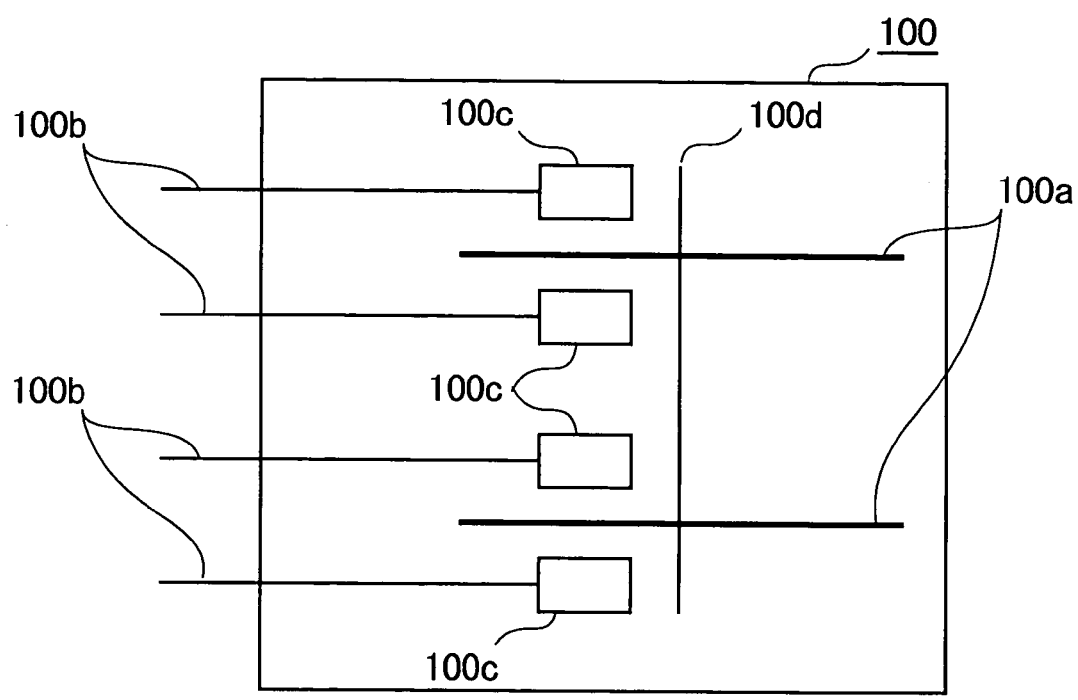
FIG. 2 is a sectional view (side view) when a storage surface of a disc of the hard disc device according to a first embodiment is set on the surface side.

FIG. 2 is a sectional view (side view) when the storage surface of the disc of the hard disc device 100 according to the first embodiment is set on the surface side. The hard disc device 100 includes a disc 100a, a head portion 100b, and a head 100c.

Normally, the hard disc device 100 performs, as illustrated in FIG. 2, reading and writing in such a way that the head 100c is set afloat by approximately 15 nm from the storage surface of the disc 100a. At this time, the hard disc device 100 stops the head portion 100b above the predetermined sector where the head 100c performs reading and writing. Then, the hard disc 100 generates, from the head 100c, the magnetic field caused by the current that is required for reading and writing, thereby reading and writing the data.

Figure 3:
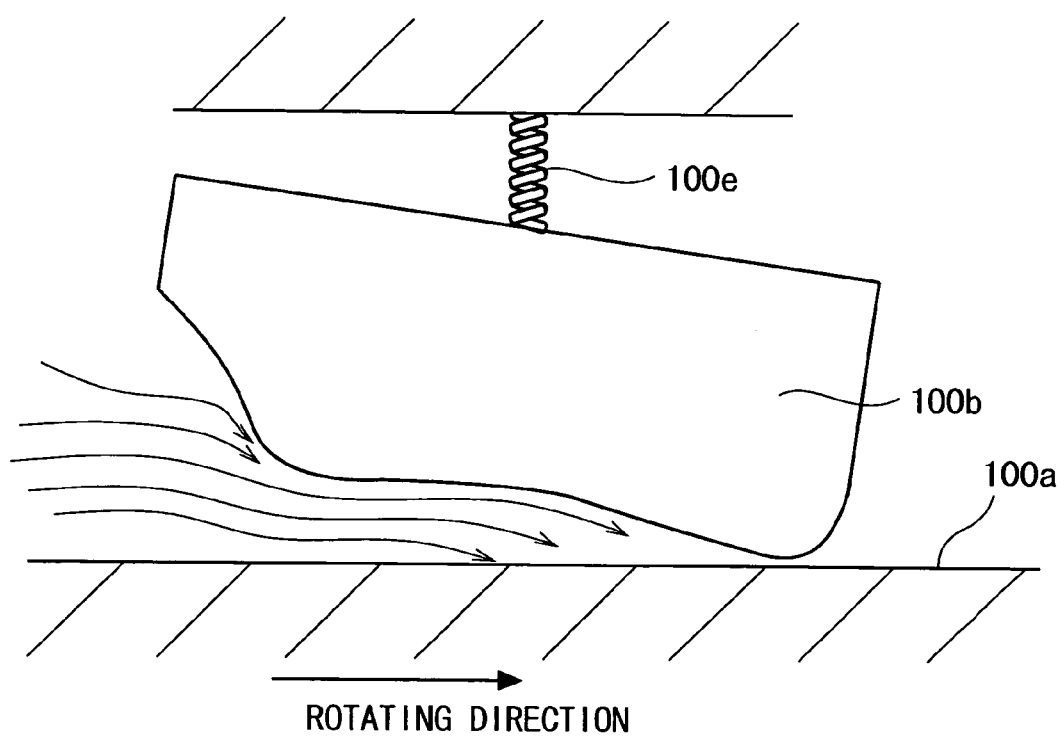
FIG. 3 is an explanatory view illustrating a principle on which a head portion of the hard disc device gets afloat.

FIG. 3 is an explanatory view illustrating a principle on which the head portion 100b of the hard disc device 100 gets afloat. In FIG. 3, the disc 100a is rotated (moved) in a direction indicated by an arrow.

Normally, the head portion 100b of the hard disc device 100 gets afloat above the surface (the storage surface) of the disc 100a by dint of airflow caused when the disc 100a rotates about a rotating shaft 100d. At this time, a pressure is produced by viscosity of the air between the disc 100a and the head portion 100b. Then, the head portion 100b gets afloat from the disc 100a with equilibration between the pressure and a spring force of a spring 100e that acts in such a direction as to get pulled apart from the disc 100a. Note that a contrivance is given to a sectional shape of the head portion 100b for generating the pressure.

In the hard disc device 100 according to the first embodiment, the head portion 100b which is usually kept afloat above the disc 100a is pressed against the disc 100a. The hard disc device 100 performs a full-seek in a state where the head portion 100b is pressed against the disc 100a. Through this operation, the hard disc device 100 executes the storage surface destruction process over the disc 100a. As a result, the data stored on the hard disc device 100 can be neither read nor written any more. The storage surface destruction process over the disc 100a according to the first embodiment includes control of reducing the number of revolutions of the disc, control of changing the rotating direction of the disc, and the process of pressing the head portion (pressed against the head by the pressing portion).

The reduction control of the number of revolutions of the disc is the control of decreasing the pressure for floating the head portion 100b by reducing the number of revolutions of the disc 100a, and of thus pressing the head portion 100b against the disc 100a. Under this reduction control of the number of revolutions of the disc, the storage medium destruction control unit 102, in response to an instruction, given from the computer (unillustrated), purporting that the storage surface destruction process be executed, instructs the DE 110 to reduce the number of revolutions of the spindle motor. Further, the storage medium destruction control unit 102 moves the head portion 100b to the storage surface of the disc 100a.

The change control of the rotating direction of the disc is the control of preventing the pressure for floating the head portion 100b from being produced in a way that reverses the normal rotating direction of the disc 100*a*, and of thus pressing the head portion 100*b* against the disc 100*a*. Under this rotating direction change control, the storage medium destruction control unit 102, in response to an instruction, given from the computer, purporting that the storage surface destruction process be executed, instructs the DE 110 to change the rotating direction of the spindle motor. Moreover, the storage medium destruction control unit 102 also instructs the DE 110 to move the head portion 100*b* to the storage surface of the disc 100*a*.

The head portion pressing control is the process of forcibly pressing the head portion 100*b* against the disc 100*a* by an actuator (unillustrated), etc. In this head portion pressing process, the storage medium destruction control unit 102 instructs the DE 110 so that a perpendicular position of the head portion 100*b* comes to a position of pressing the head portion 100*b* against the disc 100*a*.

Figure 4:
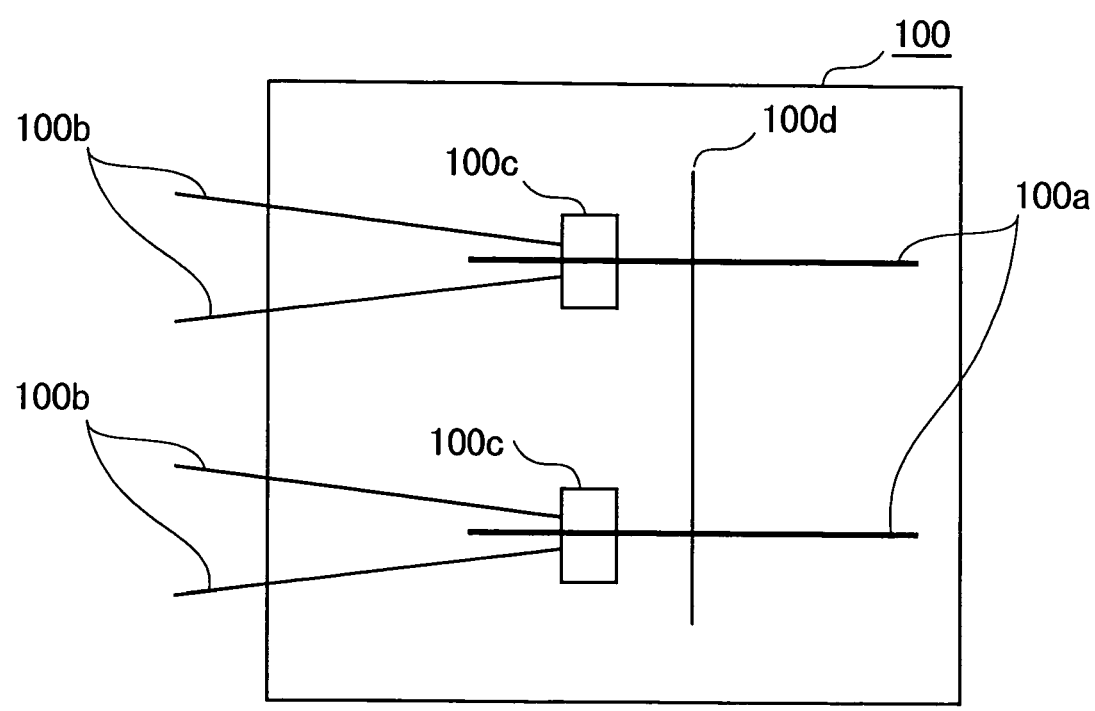
FIG. 4 is an explanatory view showing a state where the head portion is pressed against the disc in the hard disc device according to the first embodiment.

FIG. 4 is an explanatory view showing the state where the head portion 100*b* is pressed against the disc 100*a* in the hard disc device according to the first embodiment. In FIG. 4, the head portion 100*b* is pressed against the disc 100*a*. Then, the storage medium destruction control unit 102 rotates the spindle motor when the head portion 100*b* is kept pressing, and simultaneously moves the head portion 100*b* along the storage surface. Through this operation, the entire storage surface of the disc 100*a* of the hard disc device 100 is destroyed, whereby the data can be neither read nor written any more.

<Flowchart in First Embodiment>

Next, the storage surface destruction process by the hard disc device 100 according to the first embodiment will be explained with reference to a flowchart.

Figure 5:
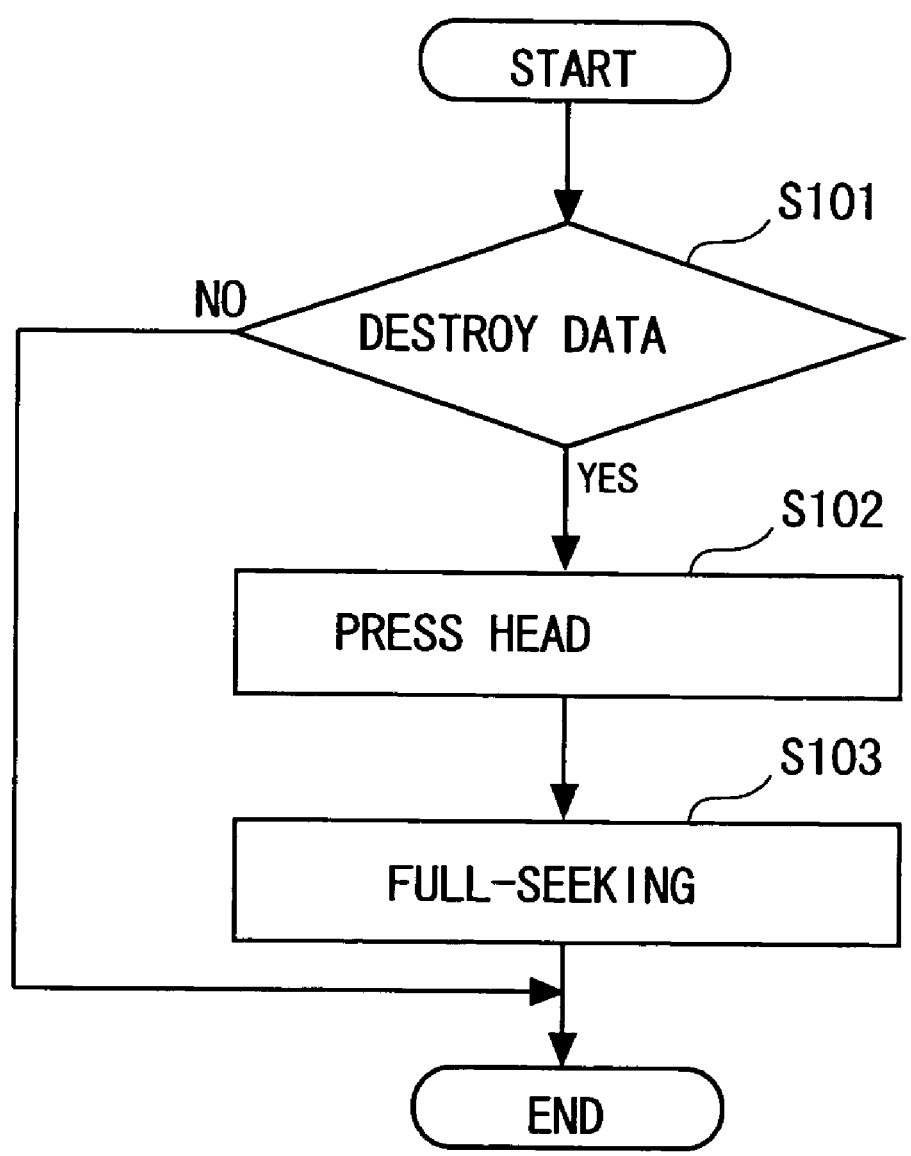
FIG. 5 is an explanatory flowchart of a storage surface destruction process by the storage device in the first embodiment.

FIG. 5 is an explanatory flowchart of the storage surface destruction process by the hard disc device 100 in the first embodiment.

To begin with, the storage medium destruction control unit 102 judges whether the data given from the computer should be destroyed or not (the storage surface destruction process should be executed or not) (in step 101 in FIG. 5, which will hereinafter be abbreviated such as S101). At this time, if given an instruction purporting that the data be kept undestroyed, the storage medium destruction control unit 102 finishes this process.

The storage medium destruction control unit 102 accepting the instruction purporting that the data be destroyed, for example, under the reduction control of the number of revolutions of the disc, presses the head portion 100*b* against the storage surface of the disc 100*a* (S102). Further, the storage medium destruction control unit 102 accepting the instruction purporting that the data be destroyed, for example, under the change control of the rotating direction of the disc, presses the head portion 100*b* against the storage surface of the disc 100*a* (S102). Moreover, the storage medium destruction control unit 102 accepting the instruction purporting that the data be destroyed, for example, by the head portion pressing process described above, presses the head portion 100*b* against the storage surface of the disc 100*a* (S102).

Then, the storage medium destruction control unit 102, after pressing the head portion 100*b* against the disc 100*a*, executes the so-called full-seek of moving the head portion 100*b* along the entire storage surface while rotating the disc 100*a* (S103).

After completion of the full-seek, the storage medium destruction control unit 102 finishes this process.

<Effects of First Embodiment>

The following effects are acquired by actualizing the hard disc device 100 according to the first embodiment. According to the hard disc device 100 in the first embodiment, the storage medium of the hard disc device, etc. built in the computer can be destroyed without any deassembly.

Moreover, according to the hard disc device 100 in the first embodiment, the storage medium destruction process can be surely executed.

<Second Embodiment>

A second embodiment will be described with reference to FIGS. 6 through 8. The first embodiment is that the storage surface is destroyed by pressing the head portion against the storage surface of the storage medium in the storage device. The second embodiment is that the storage surface is destroyed by an electric current that generates a magnetic field equal to or higher than an allowable value when writing.

Other configurations and operations in the second embodiment are the same as those in the first embodiment. Accordingly the explanations of the same configurations and operations as those in the first embodiment are omitted. Further, in the second embodiment, FIGS. 1 through 5 are referred to according to the necessity.

<Example of Storage Surface Destruction Process>

Figure 6:
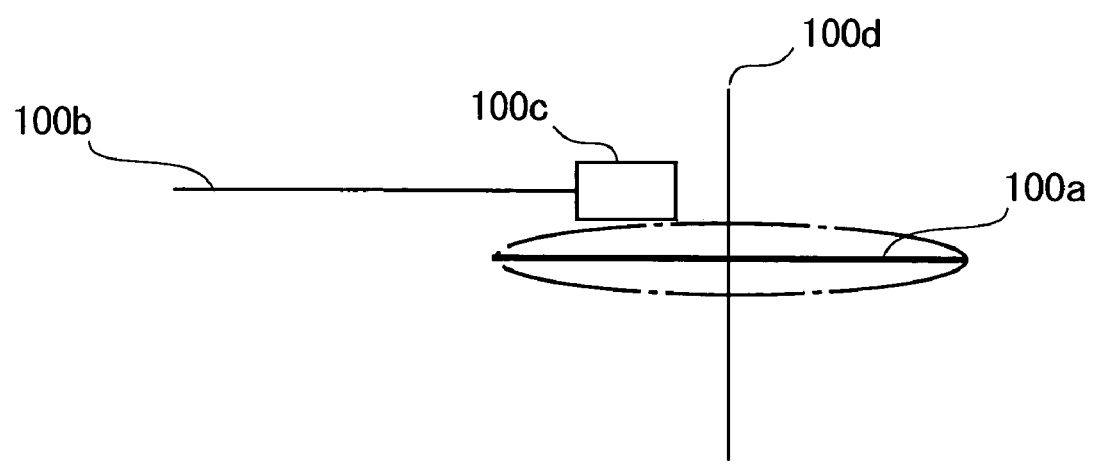
FIG. 6 is a sectional view (side view) showing a normal state when the storage surface of the disc of the hard disc device according to a second embodiment is set on the surface side.

FIG. 6 is a sectional view (side view) showing the normal state when the storage surface of the disc 100*a* of the hard disc device 100 according to the second embodiment is set on the surface side. Further, FIG. 7 is a sectional view showing a state where the storage surface destruction process of the disc 100*a* according to the second embodiment is executed. The hard disc device 100 includes the disc 100*a*, the head portion 100*b* and the head 100*c*.

Normally, the hard disc device 100 performs, as illustrated in FIG. 6, writing in such a way that the head 100*c* is set afloat by approximately 15 nm from the storage surface of the disc 100*a*. At this time, the hard disc device 100 stops the head portion 100*b* above the predetermined sector where the head 100*c* performs writing. Then, the hard disc 100 generates, from the head 100*c*, the magnetic field caused by the current that is required for writing, thereby writing the data.

Figure 7:
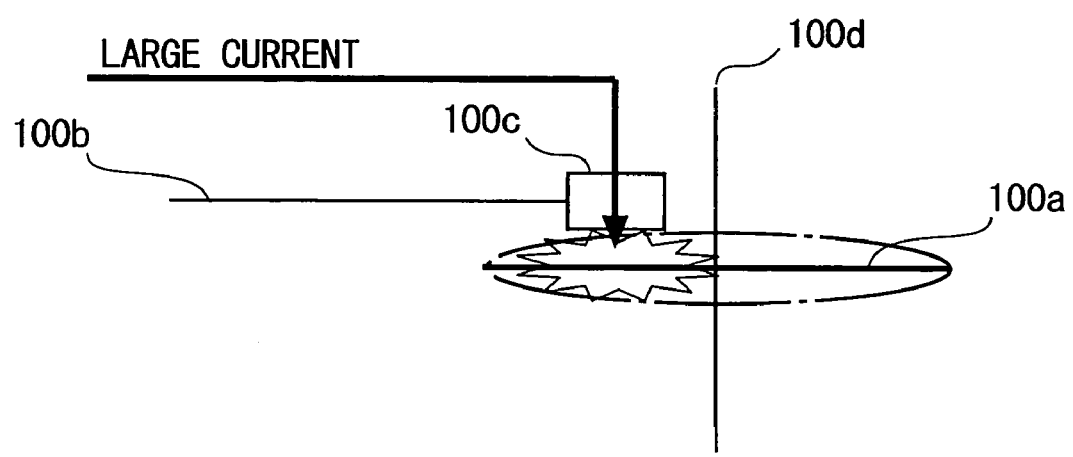
FIG. 7 is a sectional view showing a state where the storage surface destruction process according to the second embodiment is executed.

In the storage surface destruction process according to the second embodiment, as shown in FIG. 7, the magnetic field equal to or larger than a tolerance is generated from the head 100*c* by the current when writing the data. Then, the magnetic field generated by the current, which is equal to or larger than the tolerance, destroys the magnetic field over the storage surface of the disc 100*a*, whereby the data can be neither read from nor written to the storage medium any more.

<Flowchart in Second Embodiment>

Next, the storage surface destruction process by the hard disc device 100 according to the second embodiment will be described with reference to a flowchart.

Figure 8:
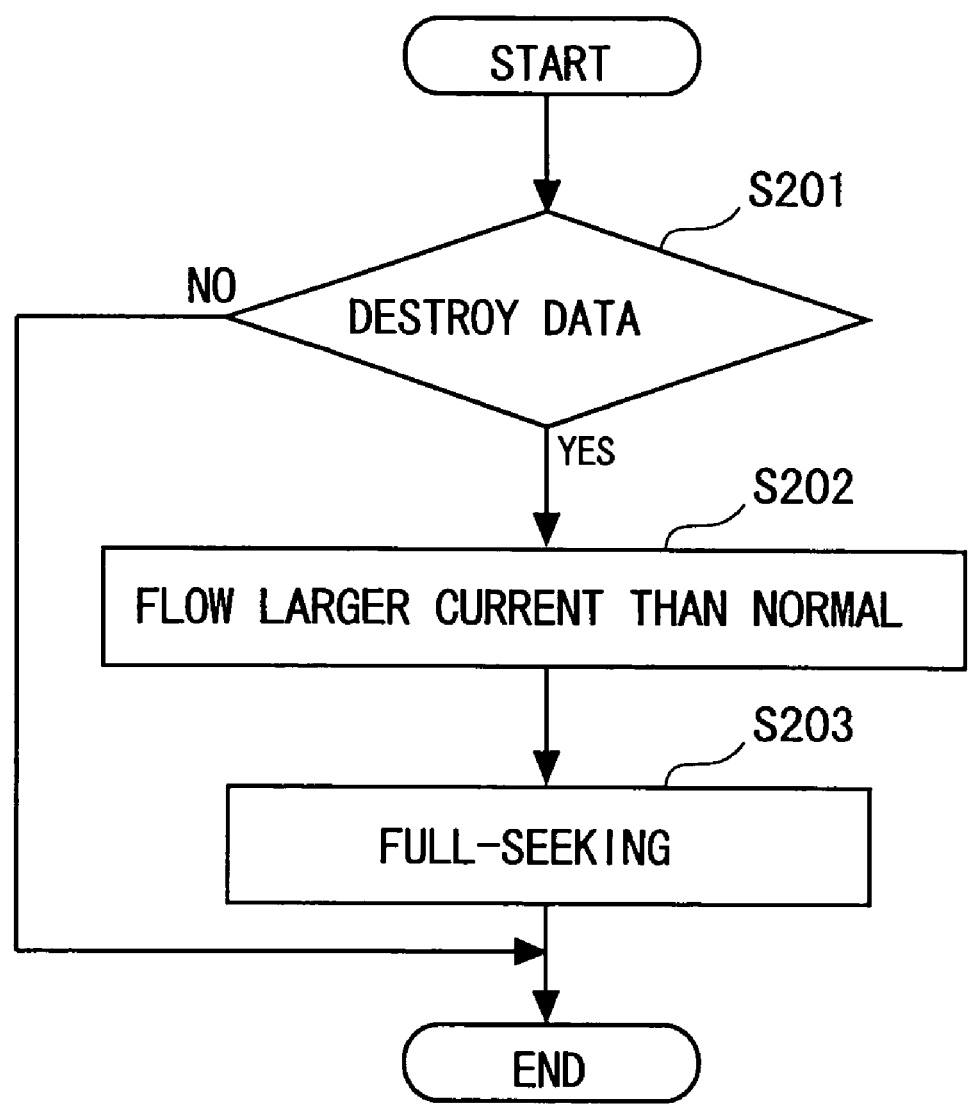
FIG. 8 is an explanatory flowchart of the storage surface destruction process by the storage device in the second embodiment.

FIG. 8 is an explanatory flowchart of the storage surface destruction process by the hard disc device 100 in the second embodiment.

To start with, the storage medium destruction control unit 102 judges whether the data given from the computer should be destroyed or not (the storage surface destruction process should be executed or not) (in step 201 in FIG. 8, which will hereinafter be abbreviated such as S201). At this time, if given an instruction purporting that the data be kept undestroyed, the storage medium destruction control unit 102 finishes this process.

The storage medium destruction control unit 102 accepting the instruction purporting that the data be destroyed, supplies the head 100c with the current equal to or larger than the tolerance of the current supplied when reading and writing as described above. Then, the head 100c destroys the magnetic field over the storage surface of the disc 100a by dint of the magnetic field generated by the current equal to or larger than the tolerance (S202).

Then, the storage medium destruction control unit 102, in the state of generating the magnetic field from the head 100c by the current that is equal to or larger than the tolerance, executes the so-called full-seek of moving the head 100c along the entire storage surface while rotating the disc 100a (S203).

After completion of the full-seek, the storage medium destruction control unit 102 finishes this process.

<Effects of Second Embodiment>

The following effects are acquired by actualizing the hard disc device 100 according to the second embodiment.

According to the hard disc device 100 in the second embodiment, the storage medium of the hard disc device, etc. built in the computer can be destroyed without any deassembly.

Moreover, according to the hard disc device 100 in the second embodiment, the storage medium destruction process can be surely executed.

Still further, according to the hard disc device 100 in the second embodiment, the storage surface destruction process can be executed so that the data can be neither read nor written without damaging the storage medium.

<Modifies Example>

In the present embodiment, the storage device of the present invention has been discussed by giving one example mainly of the hard disk device of the information processing apparatus, however, the present invention is not limited to this type of storage device and can be broadly carried out for other types of storage devices.

FIG. 9 is a block diagram showing one example of a normal type of hard disc device 200 according to the present embodiment. For instance, the storage medium destruction method according to the present embodiment is installed as a program executable by the computer into the computer or an MPU 201 of the hard disc device 200, whereby the storage surface destruction process of the disc can be executed even in the hard disc device 200 that does not include the storage device of the present invention. In this case, even when the hard disc device 200 is not connected to the computer, the storage surface destruction process of the disc can be executed by manipulating a jumper switch, etc. on condition that the present program is installed into the MPU 201.

Note that in the present embodiment, the storage medium destruction control unit 102 can be also actualized as so-called firmware for giving an instruction of executing the storage surface destruction process according to the present embodiment to, e.g., the read/write control unit 103 and the read/write circuit 107 (current control means), and the servo control unit 105, the positioning control unit 108, the rotation control unit 109 and the rotating position detecting unit 106. In this case, even when the hard disc device 200 is not connected to the computer, the storage surface destruction process of the disc can be executed by manipulating the jumper switch, etc. on condition that the present program is installed as the firmware into the present hard disc device.

Moreover, the storage device according to the present embodiment may execute a combination of the disc storage surface destruction processes in the first embodiment and in the second embodiment.

Moreover, the storage device according to the present embodiment is applied to the hard disc device of the computer, however, the present invention is not limited to this hard disc device and can be applied to all other types of storage mediums. The storage device of the present invention can be applied to, e.g., a CD (Compact Disc), a DVD (Digital Video or Digital Versatile Disc), an MD (Mini Disc), an FD (Flexible Disk) and so on. Among the storage mediums given above, the CD and the DVD are classified as optical recording mediums, and therefore, in the storage surface destruction process according to the second embodiment, data are destroyed by irradiating the storage surface with laser beams. Moreover, among the storage mediums given above, the MD is classified as a magneto-optic disc, and hence, in the storage surface destruction process according to the second embodiment, the data are destroyed by irradiating the storage surface with the laser beams and thus generating the magnetic field.

<Readable-by-Computer Recording Medium>

The control program in this embodiment may be recorded on a readable-by-computer recording medium. Then, a computer reads the control program on this recording medium, and executes this program, whereby the computer functions as the image processing system 200 demonstrated in this embodiment.

Herein, the readable-by-computer recording medium embraces recording mediums capable of storing information such as data, programs, etc electrically, magnetically, optically and mechanically or by chemical action, which can be all read by the computer. What is demountable out of the computer among those recording mediums may be, e.g., a flexible disk, a magneto-optic disk, a CD-ROM, a CD-R/W, a DVD, a DAT, an 8 mm tape, a memory card, etc.

Further, a hard disk, a ROM (Read Only Memory) and so on are classified as fixed type recording mediums within the computer.

INDUSTRIAL APPLICABILITY

The storage device of the present invention is capable of completely destroying the storage surface when discarded without deassembling the hard disc device, and can be therefore applied to an industry for providing the storage medium destruction technology.

<Others>

The disclosures of international application PCT/JP2003/003523, filed on Mar. 24, 2003 including the specification, drawings and abstract are incorporated herein by reference.

What is claimed is:

1. A storage apparatus comprising:
a head portion including a head at least reading or writing information from or to a storage medium;
a moving portion moving said head portion along a storage surface of said storage medium; and
a storage medium destruction control unit destroying said storage medium,
wherein said storage medium destruction control unit includes a position control unit controlling, when said moving portion moves said head portion above the storage surface, a perpendicular position of said head portion with respect to the storage surface.

2. A storage apparatus according to claim 1, wherein said position control unit further includes a pressing portion pressing said head portion against the storage surface.

3. A storage apparatus according to claim 1, wherein said storage medium is a circular storage medium, further comprising a rotating portion rotating said circular storage medium.

4. A storage apparatus according to claim 3, wherein said position control unit includes a speed control unit reducing the number of revolutions of said rotating portion.

5. A storage apparatus according to claim 3, wherein said position control unit includes a rotating direction change control unit changing a rotating direction of said rotating portion.

6. A storage apparatus comprising:
a head portion including a head at least reading or writing information from or to a storage medium;
a moving portion moving said head portion along a storage surface of said storage medium; and
a storage medium destruction control unit destroying said storage medium,
wherein said storage medium destruction control unit further includes a current control unit supplying said head with an electric current equal to or larger than an allowable value of an electric current when written to said storage medium.

7. A storage apparatus comprising:
a head portion including a head at least reading or writing information from or to a storage medium;
a moving portion moving said head portion along a storage surface of said storage medium; and
a storage medium destruction control unit destroying said storage medium,
wherein said storage medium destruction control unit further includes a magnetic field control unit generating a magnetic field equal to or larger than an allowable value of a magnetic field from said head when written to said storage medium.

8. A readable-by-computer recording medium recording a storage medium destruction program, executable by a computer for destroying a storage medium, said storage medium destruction program making said computer execute:
a moving step moving a head portion including a head at least reading or writing information from or to a storage medium along a storage surface of said storage medium; and
a destruction control step destroying said storage medium by said head portion,
wherein said destruction control step includes further making said computer execute a position control step controlling, when said head portion is moved above the storage surface in said moving step, a perpendicular position of said head portion with respect to the storage surface.

9. A readable-by-computer recording medium recording a storage medium destruction program according to claim 8, wherein said position control step includes pressing said head portion against the storage surface.

10. A readable-by-computer recording medium recording a storage medium destruction program according to claim 9, wherein said storage medium is a circular storage medium rotating about a predetermined shaft, and
said destruction control step includes reducing the number of revolutions of said storage medium.

11. A readable-by-computer recording medium recording a storage medium destruction program according to claim 9, wherein said storage medium is a circular storage medium rotating about a predetermined shaft, and
said destruction control step includes changing a rotating direction of said storage medium.

12. A readable-by-computer recording medium recording a storage medium destruction program, executable by a computer for destroying a storage medium, said storage medium destruction program making said computer execute:
a moving step moving a head portion including a head at least reading or writing information from or to a storage medium along a storage surface of said storage medium;
a destruction control step destroying said storage medium by said head portion; and
a current control step supplying said head with an electric current equal to or larger than an allowable value of an electric current when written to said storage medium.

13. A readable-by-computer recording medium recording a storage medium destruction program, executable by a computer for destroying a storage medium, said storage medium destruction program making said computer execute:
a moving step moving a head portion including a head at least reading or writing information from or to a storage medium along a storage surface of said storage medium;
a destruction control step destroying said storage medium by said head portion; and
a magnetic field control step generating a magnetic field equal to or larger than an allowable value of a magnetic field from said head when written to said storage medium.

14. A storage medium destruction method destroying a storage medium comprising:
a moving step moving a head portion including a head at least reading or writing information from or to a storage medium along a storage surface of said storage medium; and
a destruction control step destroying said storage medium by said head portion,
wherein said destruction control step includes further making said computer execute a position control step controlling, when said head portion is moved above the storage surface in said moving step, a perpendicular position of said head portion with respect to the storage surface.

15. A storage medium destruction method according to claim 14, wherein said position control step includes pressing said head portion against the storage surface.

16. A storage medium destruction method according to claim 15, wherein said storage medium is a circular storage medium rotating about a predetermined shaft, and
said destruction control step includes reducing the number of revolutions of said storage medium.

17. A storage medium destruction method according to claim 15, wherein said storage medium is a circular storage medium rotating about a predetermined shaft, and
said destruction control step includes changing a rotating direction of said storage medium.

18. A storage medium destruction method destroying a storage medium comprising:
a moving step moving a head portion including a head at least reading or writing information from or to a storage medium along a storage surface of said storage medium;

a destruction control step destroying said storage medium by said head portion, and a current control step supplying said head with an electric current equal to or larger than an allowable value of an electric current when written to said storage medium.

19. A storage medium destruction method destroying a storage medium comprising:

a moving step moving a head portion including a head at least reading or writing information from or to a storage medium along a storage surface of said storage medium;

a destruction control step destroying said storage medium by said head portion: and a magnetic field control step generating a magnetic field equal to or larger than an allowable value of a magnetic field from said head when written to said storage medium.

\* \* \* \* \*